MICRO-IMAGE VIEWER

Filed Dec. 11, 1963 4 Sheets-Sheet 1

Inventors.
Tirey C. Abbott, Jr.
William H. Lawrence
By: Louis A. Kline
John J. Matlago
Dominick Nardelli
Their Attorneys Inventors.
Tirey C. Abbott, Jr.
William H. Lawrence
By: Louis A Kline
John T. Matlago
Dominick Nardelli
Their Attorneys.

Aug. 23, 1966 T. C. ABBOTT, JR., ET AL 3,267,801
MICRO-IMAGE VIEWER
Filed Dec. 11, 1963 4 Sheets-Sheet 3
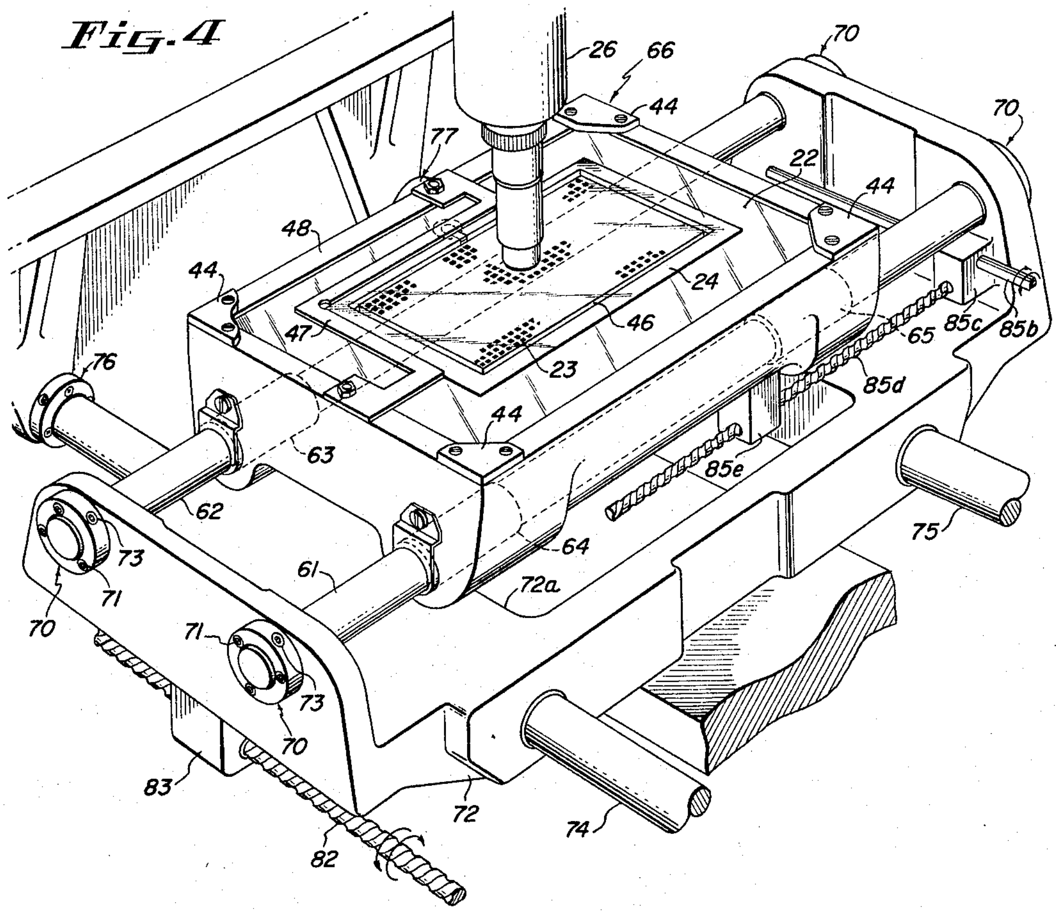
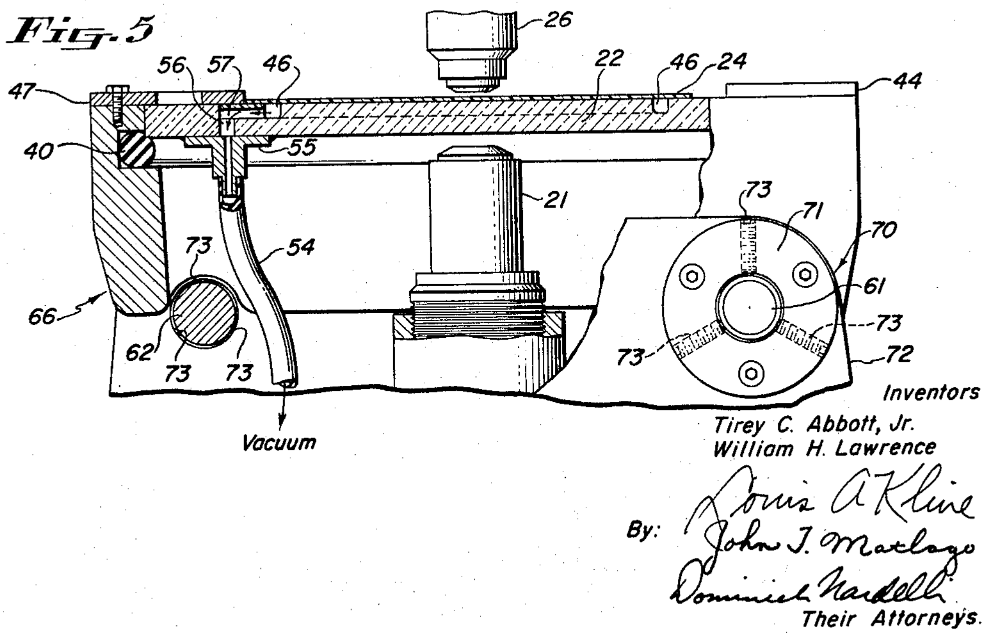
Inventors
Tirey C. Abbott, Jr.
William H. Lawrence
By: Louis A. Kline
John T. Matlago
Dominick Nardelli
Their Attorneys.

Inventors.
Tirey C. Abbott, Jr.
William H. Lawrence

By: Louis A. Kline
John J. Matlago
Dominick Nardelli
Their Attorneys.

United States Patent Office 3,267,801
Patented August 23, 1966

3,267,801

MICRO-IMAGE VIEWER

Tirey C. Abbott, Jr., Manhattan Beach, and William H. Lawrence, Palos Verdes, Calif., assignors to The National Cash Register Company, Dayton, Ohio, a corporation of Maryland Filed Dec. 11, 1963, Ser. No. 329,743
11 Claims. (Cl. 88—24)

This invention relates to micro-image viewers and, more particularly, to a viewer which enlarges recordings of micro-images, i.e., greatly reduced images on a film, so that the information forming the images can be readily viewed.

The viewer of the present invention is required to project onto a screen a picture which is about 200 times larger than the micro-image from which it is formed. The micro-image may be, for example, an image of a conventional letter size page (8½ inches wide by 11 inches long) which is reduced about 200 times to an image that is about .04 of an inch wide and .05 of an inch high. In order to preserve any finely printed information on the page, the resolution of the micro-image should be on the order of 800 lines per millimeter. With such a resolution, when the micro-image of the letter is enlarged about 200 times, the finely printed information in the picture can be readily distinguished, since it is well known that the human eye can resolve four lines per millimeter at a convenient reading distance. It is therefore apparent that the projection lens should have a relatively large numerical aperture so as to preserve the high resolution of the system, and a relatively short working distance so as to keep the size of the lens and viewer small and inexpensive.

It is well known that, in order to easily read a projected picture, the intensity of the projection light beam should be increased as the ambient light intensity around the screen increases and as the order of magnification increases. Thus, in order to read a micro-image of a letter size page in a well-lighted office, such that the information may be readily discernible from the screen by the operator of the viewer, the intensity of the projection beam, illuminating the micro-image, is required to be so large that the heat created by the light beam could easily burn the film on which the micro-image is printed, unless precautions are taken to avoid or dissipate the heat.

In the past, a photograph of the desired image was taken with high speed photography in order to keep the film from being excessively heated. This is undesirable, however, because the photographs are wasted whenever the film is to be searched to find a particular micro-image. It has also been suggested to paste the images on a metallic foil which would provide for conducting heat away from the bright light spot. This procedure requires illuminating the micro-image with reflected light. Illuminating a micro-image with reflected light is an inefficient process as most of the light is wasted. It has also been suggested to press the film between two relatively thick clear glass plates. This procedure allows the light beam to shine through the glass plates, and the glass plates, being thick, are sufficiently rigid to apply pressure to the film so that the glass can conduct heat away from the film. However, utilizing a thick glass plate between the film and the projection lens has its disadvantages since it limits the resolution of the system. This invention provides a novel means that holds a film flat against a rigid glass plate without limiting the light intensity, magnification, or resolution of the system.

One object of this invention is to provide a micro-image viewer which enlarges a micro-image about 200 times so that the enlarged picture can be viewed on a screen in a well-lighted room.

Another object of this invention is to provide a viewer which prevents a transparent film from being excessively heated even though one surface of the film is exposed to air and a high intensity light beam passes through the film.

Another object of this invention is to provide a viewer with vacuum means for holding a transparent flexible film against a rigid optically clear glass plate in order to keep the film cool.

Another object of this invention is to provide a viewer that magnifies an image about 200 times and that has a film transport mechanism that moves a film substantially within a fixed plane in order to maintain the film within prescribed limits with respect to the depth of focus of a projection lens.

Another object of this invention is to provide an improved viewer that magnifies micro-images about 200 times and that reduces screen scintillation to a minimum.

Broadly, one embodiment of the micro-image viewer comprises an optical system having a projection lens for projecting onto a viewing screen an enlarged picture of one of a plurality of micro-images that are provided on a 3″ x 5″ rectangular piece of film. The enlarged picture is about 200 times greater than the image whose size is about .04 inch by .05 inch. The viewer includes a film transport means for moving the 3″ x 5″ film with respect to the projection lens so that any one of the micro-images can be positioned for viewing on the screen. The film transport means also maintains the film, as it is moved, within prescribed limits with respect to the depth of focus of the projection lens, to maintain a substantially focused picture on the viewing screen. The film transport means includes an optically flat clear glass plate for supporting the 3″ x 5″ film at the focal plane of the projection lens. The film is held tightly against the plate by atmospheric pressure acting against a vacuum produced between the film and the supporting glass plate. This arrangement eliminates the need of a top glass plate to hold the film, so that there is only air between the film and the projection lens. This permits the projection lens to have a relatively small working distance. The vacuum is produced by drawing air from a continuous groove formed on the surface of the glass plate, and in the shape of the film. The film is placed on the glass plate with all the micro-images enclosed within the boundary formed by the groove and with the film margin extending over the groove. The spacing between the film and the light source has only clear glass permitting the full intensity of the beam to illuminate the micro-image. The flat glass plate is mounted in a rigid frame which, in turn, is supported for movement in two orthogonal directions, so that the film is restrained to move substantially within a fixed plane in which all the micro-images on the film are accessible for viewing. The frame is slidably supported at three points to facilitate maintaining the moving film in a plane that is oriented normal to the optical axis of and located at a precisely fixed distance from the projection lens. Since the film is also held tightly against the flat glass plate, focusing is maintained over substantially the full length of the film, and the glass plate is able to function as a heat sink to keep the high intensity light beam from burning the film. To insure that the film lies firmly against the glass plate during operation of the viewer, a transducer is provided that responds to the vacuum pressure in the groove to indicate when the film loosens away from the glass because of a loss of vacuum due to some malfunction of the film supporting system. When the vacuum is lost, the transducer functions to cut-off the projection light beam, indicating that the film is improperly spaced from the glass plate.

Other objects, advantages, and features of the present invention will become apparent from consideration of the following description when taken in conjunction with the appended claims and drawings wherein:

FIG. 4 is an enlarged pictorial view of the micro-image film holder and transport mechanism showing the relative position of the projection lens and the film;

FIG. 5 is an enlarged partial section of the left side of the transport mechanism shown in FIG. 4;

As used in this disclosure, the term micro-image refers to an image that has a resolution of over 500 lines (line-pairs) per millimeter and up to 2000 lines (line-pairs) per millimeter, and that has, in general, an area of one square millimeter. Resolution is a measurement of the number of equivalent line-pairs (a line-pair consists of one black line adjacent to a white line) per millimeter that are distinguishable in an image or picture. A film refers to a thin flexible transparency on which the micro-images are provided, and the film may be made of, for example, a cellulose film having sufficient thickness, about three tenths of a millimeter, to provide some stiffness in the film. A transparent film, in general, refers to a rectangular film provided with micro-images disposed in rows and columns, for example, a 3" x 5" film provided with over 2000 micro-images. A picture refers to any intelligent information projected on a screen. The working distance of a projection lens is the space between the film and the nearest element of the lens.

Figure 1:
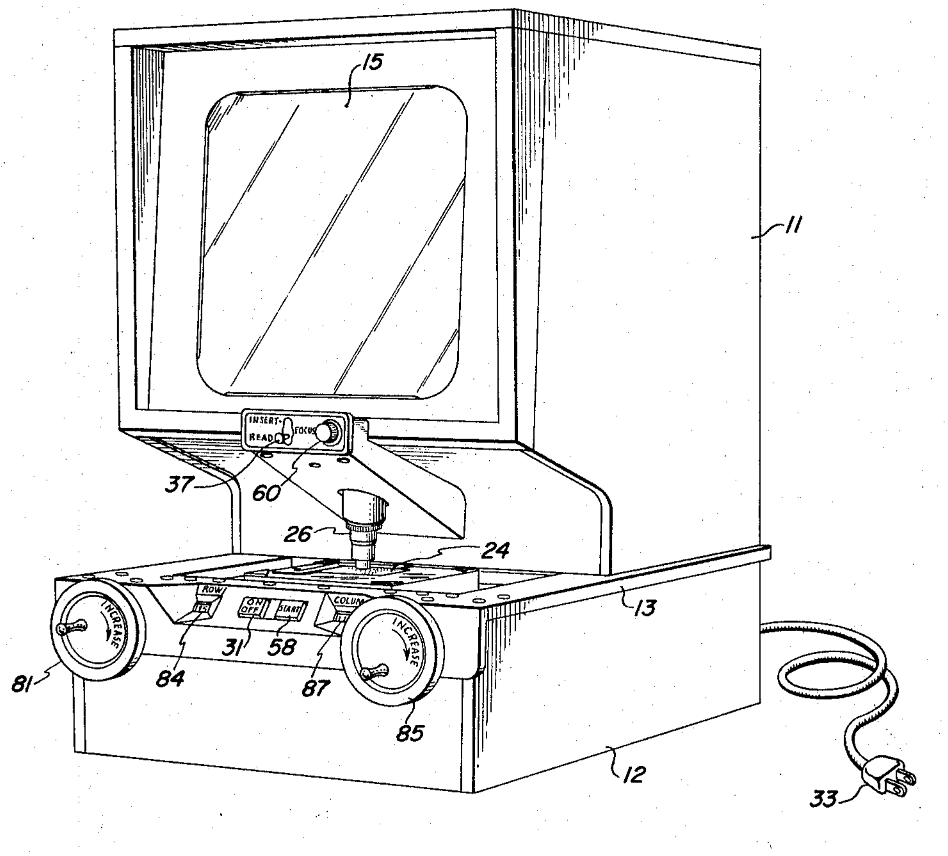
FIG. 1 is a perspective view of the micro-image viewer embodying the invention.
Figure 2:
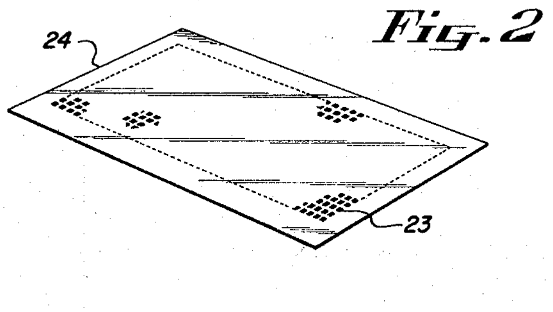
FIG. 2 is a plan view of a typical micro-image film.
Figure 3:
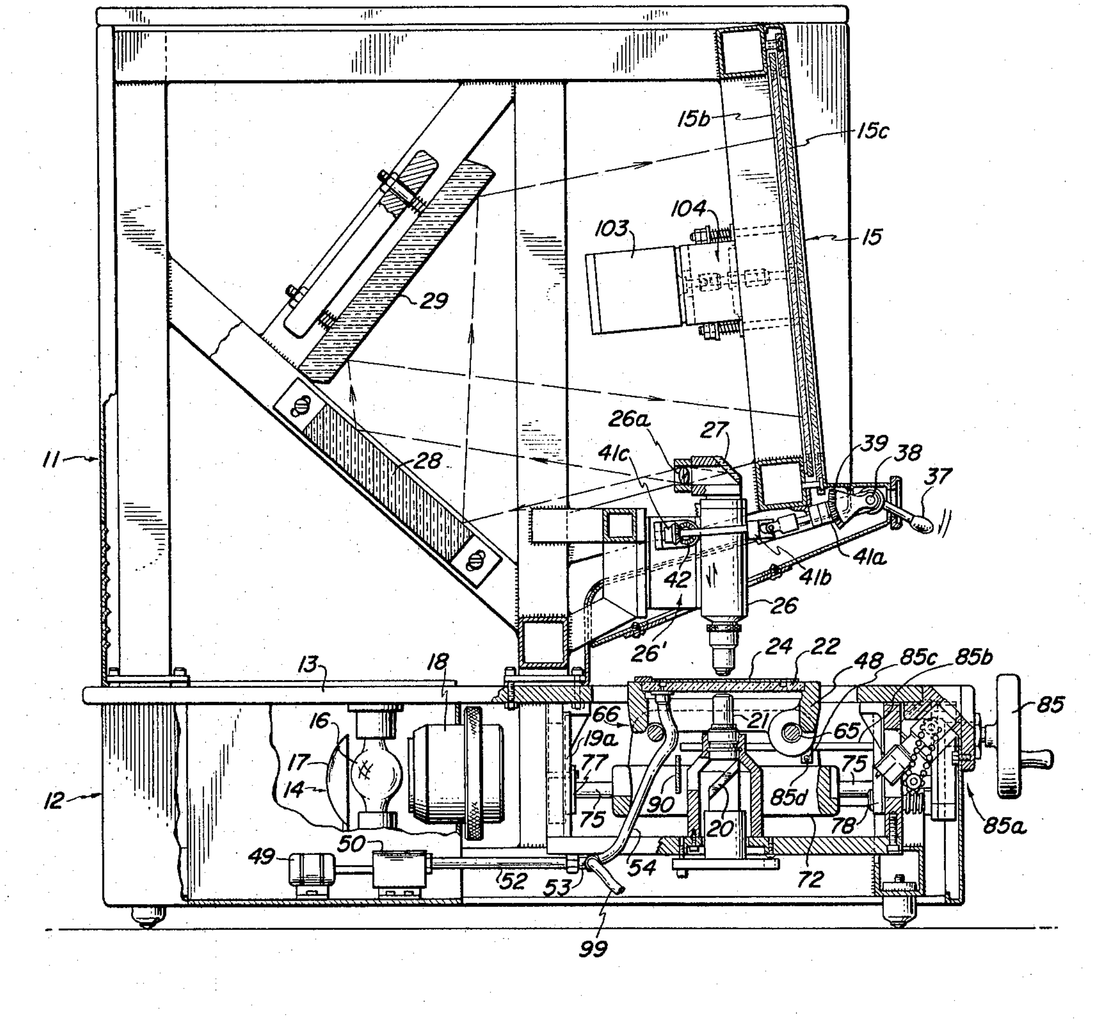
FIG. 3 is a section and side elevation of the viewer.
Figure 6:
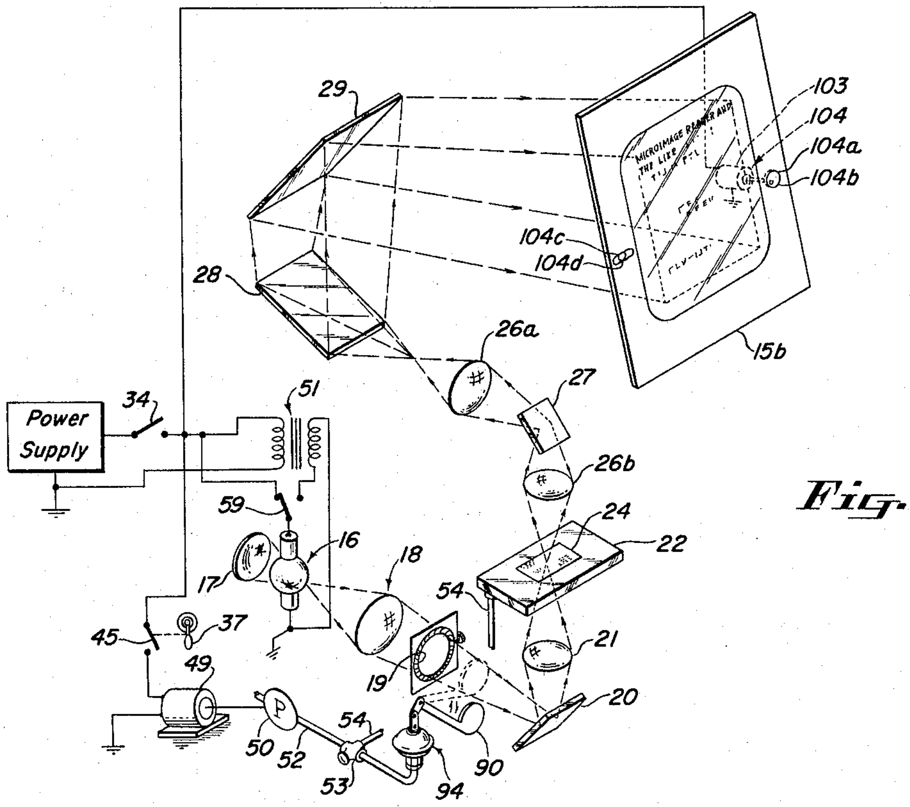
FIG. 6 is a pictorial view showing the optical and electrical elements in schematic.

Referring now to FIGS. 1, 3 and 6, the micro-image viewer has an upper enclosure 11 and a lower enclosure 12 separated by a horizontal light shield 13 made of, for example, metal. The lower enclosure 12 houses a light condensing system 14 (FIG. 3) that produces a high intensity light beam for projecting a picture onto a screen 15. The screen, in turn, is disposed on the front of the upper enclosure 11. As shown in FIG. 3, the light condensing system 14 includes a light source 16, for example, a xenon arc lamp, disposed between a spherical mirror 17 and a lens and heat filter assembly 18. The mirror 17 and lens assembly 18 projects a light beam through a light iris 19 (more clearly shown in FIG. 7) onto a mirror 20. The light iris 19 is formed in a structural plate **19*a*. The mirror 20, being disposed at an angle with the light beam, deflects the light beam upward through a light condensing lens 21. The light condensing lens focuses a reduced image of the iris 19 substantially within the plane of the upper surface of a horizontal flat glass plate 22. The area of the image of the iris at the upper surface of the glass plate 22 is sufficient to illuminate at least one micro-image 23 provided on a transparent film 24. As shown in FIG. 2, the film 24** has a plurality of micro-images arranged in rows and columns. The film is of sufficient size so as to provide a border around the micro-images.

The film 22, being placed on the glass plate 24, is held tightly in its working position by means to be described more fully hereinafter. The light beam passes through the film 24 and out of the lower enclosure 12. The light beam is now collected by a projection lens 26 that is placed above the film 24. In this embodiment, the projection lens is, for example, a commercially available compound microscope with the required optical features that will be explained hereinafter.

The light beam passes through the projection lens 26 into the upper enclosure 11 and is reflected to the rear of the upper enclosure 11 by a folding mirror 27 which is a part of the microscope optics. The microscope 26, being a compound microscope, has a number of lens elements including lenses at positions **26*a* and 26*b* (FIG. 6). Located in the rear of the upper enclosure is another folding mirror 28 that reflects the beam upward to a third folding mirror 29. The third mirror 29 reflects the light forward onto the screen 15**.

To operate the viewer, the "On-Off" button 31 (FIG. 1) located on the front of the lower enclosure 12 is pushed to close a first interlock switch 34 (shown schematically in FIG. 6) in the power circuit. Electric power is received, for example, from a standard 110 volt A.C. outlet through an electric plug 33 (FIG. 1). Because the working distance of the projection lens 26 and the glass plate 22 is, for example, only 1.5 millimeters, the lens 26 is moved out of the way, before a film, like the film 24, is placed on the glass plate 22. This is accomplished by a lever 37 that is located on the front of the upper enclosure. When the lever 37 is lifted up to the "insert" position, it pivots about a pin 38 (FIG. 3) to cause a bevel gear sector 39 to rotate a bevel gear **41*a* at one end of a shaft 41*b*. A bevel gear 41*c* on the other end of the shaft 41*b* engages and causes a bevel gear 42 to rotate the coarse focus shaft of the microscope mount 26'. The mount 26' for the microscope is, for example, a standard mount for commercial microscopes with a "coarse focus" and a "fine focus" adjustment. The lens 26 is now spaced, for example, one quarter of an inch above the glass plate 22. This allows easy placement of the film 24 on the glass plate 22. After the film 24 is placed between the lens 26 and the glass plate 22, the lever 37 is pushed down to the "read" position. In turn, the projection lens is moved down to the working position which for this lens, as mentioned before, is about 1.5 millimeters above the glass plate 22. At the same time that lever 37 is pushed down, a switch 45 (FIG. 6) is closed and a motor 49 and vacuum pump 50 is turned on. The function of the vacuum pump 50 will be more fully described hereinafter. However, due to the short depth of focus of the projection lens 26, before a picture can be formed on the screen 15, the film 24 must be held flat against the glass plate 22**. When the film is flat against the glass plate, the whole micro-image is substantially parallel to and in or close to the focal plane of the projection lens. Since the working distance is small, the means, mentioned above, for holding down the film flat against the glass plate must not interfere with the position of the projection lens. Also, since the intensity of the light beam is high, the means should prevent the light from burning the film.

Referring to FIGS. 4 and 5, the means that accomplishes both these results is a combination of components that produces a vacuum to hold the film against the glass. The means includes a continuous groove 46 formed n the upper surface of the glass plate 22. The groove has a rectangular shape to match the rectangular shape of the film 24. The groove is connected to the intake of a vacuum pump 50, mentioned above, by a tubing 52 (FIG. 3), a T-fitting 53, and a flexible tubing 54. The other branch of the T-fitting 53 connects the pump 50 to a transducer 94 (FIG. 7) through a tubing 99. The function of the transducer will be explained more fully hereinafter. The flexible tubing 54 communicates with the groove 46 with the help of a suitable short tube stem 55 (more clearly shown in FIG. 5), sealed to the underside of the movable glass plate 22. The tube stem 55, in turn, communicates with a vertically disposed bore 56, a horizontally disposed passageway 57 (both formed in glass plate 22), and, in turn, with the groove 46. The suction action on the film is readily started when the operator of the viewer places his fingers over the border of the film surrounding the groove 46. Since the film 24 is about 3 inches wide by 5 inches long this can readily be done. At the same time the film 24 is held against an alignment jig 47. The jig 47 serves the function of aligning the film with the groove 46 so that all the micro-images are within the area bounded by the groove and so that a particular micro-image can be readily addressed by an addresss system to be described hereinafter. When the margin of the film 24 is in intimate contact with the glass and over the groove 46, the margin is held down against the groove by atmospheric pressure. Then, because the film is relatively flexible, the suction applied along the border of the film causes the air caught between the film and the glass to be sucked out by the vacuum pump 50, and atmospheric pressure is able to urge the entire film flat against the glass plate 22. Since the film is relatively stiff, the film will lie flat without forming any folds or creases.

Now that the surface of the film is tight against the glass, the glass is able to cool the film, and the lamp 16 can be turned on. Since the lamp is a xenon arc, its starting voltage is higher than its operating voltage. A suitable transformer 51 (FIG. 6) to produce this result can be readily provided for in the system. As an example, when a "Start" button 58 (FIG. 1), located next to the "On-Off" button 31, is pushed, a single pole, double throw switch 59 (FIG. 6) is actuated and the higher voltage that is supplied by the transformer and that is suitable to start the arc is coupled to lamp 16. When the arc is started the "Start" button 58 is released. Switch 59 returns to the position as shown in FIG. 6 and the line voltage that is required to operate the lamp 16 is continuously coupled to the lamp. With the lamp on, a very bright light spot is focused on the film by the light condensing system 14.

In this invention, although suitable heat filters are located in the lens and filter assembly 18, heat is inherently generated in the film when some of the light is absorbed by the opaque portions of the micro-image. The amount of heat generated is directly proportional to the light intensity on the film. Because the micro-image is to be magnified about 200 times (back to its original size), and because of the necessity to view the picture in a well-lighted room, the intensity of the light beam, when it passes through the micro-images, is required to be, for example, on the order of one million foot candles. A light concentration of one million foot candles on the film can illuminate the screen 15 with a light intensity of about twenty foot candles, which is sufficient to make the front of the screen appear bright in a well-lighted room. However, light concentrations of one million foot candles would burn a transparent film of the type described within a very short time if the means, just described, has not been provided to suitably cool the film. The film is cooled because the glass plate 22, being in intimate contact with the film 24, conducts the heat away from the film.

Now that the film 24 is held flat and tight against the glass plate 22, the picture on the screen 15, if it is not in full focus, may be brought into focus by rotating a focusing knob 60 (FIG. 1) located next to the "insert" lever 37. The knob 60 is coupled to the fine adjustment shaft (not shown) of the microscope mount 26' by a gear and shaft assembly (also not shown) that is similar to the gear and shaft assembly 39, **41*a*, 41*b*, 41*c* and 42**, associated with the coarse adjustment shaft (FIG. 3).

Now with one of the micro-images on the film projected and in focus on the screen, the viewer includes a feature that allows relatively convenient searching for information from one micro-image to another micro-image. Also, while the operator is searching the transparent film for a particular micro-image, the focus of the picture of each micro-image, as each is projected on the screen, is maintained in reasonable sharpness. In order to maintain a sharp picture on the screen, the micro-image must be positioned within the depth of focus of the projection lens 26. As mentioned before, to keep the cost of the viewer low, a commercially available microscope as used herein has a numerical aperture of, for example, three tenths measured in air. The acceptable depth of focus of such a microscope is one micron. Because the microscope is a commercial model, the working distance is about 1.5 millimeters. It should be noted that if the size of the microscope is increased while maintaining the numerical aperture constant, the working distance can be proportionally increased. However, larger microscopes are more expensive and the resolution would be the same as the resolution is primarily dependent on the numerical aperture of the microscope.

Because a high resolution viewer requires a projection lens with a large numerical aperture, the depth of focus is relatively small. Therefore to maintain the micro-image film 24 within the depth of focus, an optically flat upper surface is provided on the glass plate 22. The tolerance of the optically flat surface should be less than the depth of focus of the projection lens. The glass plate 22 is supported by a suitable rigid frame 48 with the optically flat surface oriented perpendicular to the optical axis of the projection lens 26. The glass plate 22 is suitably held by corner clamps 44 pressing the glass against a suitable resilient O-ring 40. The frame 48 is disposed to move in two orthogonal directions that are mutually orthogonal to the optical axis of the projection lens. In turn, the distance between the optically flat glass surface and projection lens is relatively constant within the previously defined tolerance as the glass plate 22 is moved under the lens 26. Inasmuch as precise orthogonal motion is difficult to obtain, features are included in the viewer that allow the frame 48 to be adjustably mounted to produce as near to orthogonal motion as is required.

In this embodiment the frame 48, that supports the glass, is disposed to slide along transversely disposed rods 61 and 62. The rods 61 and 62 are made of commercially available ground-rod steel stock. Suitable bearings 63, 64 and 65 (shown by dashed lines) disposed between the frame 48 and rods 61 and 62 are provided at three corners of the frame, so that the frame 48 is able to move freely transversely across the viewer. It should be noted that a bearing is not provided between the rod 62 and the frame 48 at a fourth corner 66 of the frame. The frame 48, being made of for example, relatively massive aluminum, is sufficiently rigid to prevent the fourth corner 66 from sagging. With three bearings the frame 48 is stable at any position on the rods 61 and 62 and no stress is placed in the frame even though the rods may not be in perfect parallelism to each other. However, to maintain the distance between the optical surface and the lens 26 substantially constant, the rods 61 and 62 are mounted in an adjustable relationship to a lower movable support 72 by adjustment means 70. Each adjustment means 70 includes a ring 71 suitably bolted to the lower movable support 72 and each ring 71 has three radially disposed set screws 73 (FIG. 5) that screw radially into the ring 71 to make contact with the respective rod within the ring 71. By tightening and loosening certain set screws 73 on the adjustment means 70, rods 61 and 62 can be adjusted to be as parallel to each other as is required, and the optically flat upper surface on the glass plate 22 can be adjusted to maintain a position that is substantially normal to the optical axis of the projection lens 26. The glass plate 22 can maintain this relationship with the projection lens 26 regardless of which poistion the plate is moved to, transversely across the viewer. Now, as the film 24 is moved transversely across the viewer, each of the micro-images in one row is projected, in turn, on the screen to form substantially readable pictures.

In addition to having the film move transversely to search the micro-images in one row, the film should move normal thereto so that a search can be made of the micro-images in one column. This is accomplished by mounting the lower movable support 72 on two other parallel disposed rods 74 and 75. Like rods 61 and 62, these rods are made of ground-rod steel stock. The rods 74 and 75 are oriented perpendicularly to the rods 61 and 62 with the condensing lens 21 disposed therebetween, so that the light beam shines through an opening **72*a*** formed in the support 72. The rear ends of rods 74 and 75 are mounted to the structural frame of the viewer by suitable adjustment means 76 and 77 (as shown in FIG. 4). The front ends of the rods are also mounted to the viewer, for example, like the front end of rod 75 being mounted to the viewer by an adjustment means 78 (FIG. 3). The four adjustment means to which the respective ends of rods 74 and 75 are mounted function very similar to the adjustments means 70 for rods 61 and 62. Therefore, the rods 74 and 75 can also be adjusted substantially parallel to each other, and the optically flat surface of the glass plate 22 can be adjusted perpendicularly to the optical axis of the projection lens 26 regardless of which position the plate 22 is moved to along the rods 74 and 75. In the same manner as frame 48 is mounted by three bearings to slide along rods 61 and 62, support 72 is similarly mounted to slide along rods 74 and 75. For example, two spaced siutable bearings (not shown) are disposed between the support 72 and one rod 74, and one suitable bearing (also not shown) is disposed between the support 72 and the rod 75. Now as the film is moved towards or away from the front of the viewer, all the micro-images in one column are projected, in turn, on the screen to form a substantially readable picture.

Referring again to FIG. 1, the position of the support 72 and frame 48, and therefore the film 24 with respect to the projection lens 26 is controlled by two hand operated wheels located on the front of the viewer. The two wheels are a part of the address system mentioned above. A wheel 81 (on the left of the figure) controls the movement of the film towards or away from the front of the viewer, i.e., it selects the row of micro-images that is to be in the field of view of the projection lens 26. This is readily accomplished because a screw 82 (FIG. 4) is rotated through suitable reducing gears (not shown) that are coupled to the wheel 81. In turn, the screw 82 engages internal threads formed in a lug 83 fixed to the support 72. The support 72 is made to slide along rods 74 and 75 as the wheel 81 is rotated. Since the film 24 is aligned with the jig 47, a row indicator 84 that is actuated by a suitable mechanical linkage (not shown) coupled to the wheel 81 indicates the row that is in the field of view of the projection lens. Another wheel 85 (on the right of FIG. 1) controls the transverse movement of the film across the viewer, i.e., it selects the column of micro-images that is to be in the field of view of the projection lens 26. The wheel 85 selects a column of micro-images in substantially the same manner as the wheel 81 selects a row of micro-images. The wheel 85 through suitable reducing gears and linkages (noted generally by 85*a*) rotates a spline 85*b*. Because the lower support 72 moves, the spline 85*b* is made to slide through a suitable gear box 85*c* fixed to support 72. Then, as the spline 85*b* rotates its turns a screw 85*d*. The screw 85*d* is disposed transversely within the viewer at right angles to screw 82 (see FIG. 4) and engages internal threads formed in a suitably disposed lug 85*e* fixed to the movable frame 48. The frame 48 slides along the rods 61 and 62 as the wheel 85 is rotated. A column indicator 87 is also provided on the front of the viewer which column indicator is actuated by the wheel 85.

When the operator is finished with the particular film, it is removed from the viewer by simply lifting lever 37. The upward motion of the lever 37 causes the switch 45 (FIG. 6) connected to the vacuum motor 49 to open and the vacuum holding the film is removed. The film, being now free from the plate 22, can be picked up and a new film inserted under the projection lens 26. However, before the newly inserted film can lie flat against the glass 22, again lever 37 must be pushed down to start the motor 49 and vacuum pump 50. As before, the margin of the film is manually held against the glass until the vacuum takes over. However, not as before, "Start" button 58 does not have to be pushed again to turn on the lamp 16. The lamp need not be turned off when film 24 is changed. The lamp 16 is turned off, for example, when the "On-Off" button 31 is again depressed to open switch 34. Therefore, to ensure that the high intensity light does not burn the film before the vacuum is able to draw out the air trapped between the film and the glass, the invention provides a means that cuts-off the light beam whenever the absolute pressure in the vacuum tubing 54 is relatively high. A high pressure in tubing 54 usually means that there is a space filled with air between the film and the glass. This is undesirable because, due to the high intensity light, the film becomes hot as the glass can only efficiently cool the film when the film is lying flat against the glass. It should be noted that the film itself cannot conduct sufficient heat from the highly illuminated spot as the film is required to be relatively thin. A thin, flexible film is desirable because large numbers of them can be conveniently stored in a file drawer. It should thus be clear that the means, that cuts-off the light beam, is highly useful since, if by chance at any time during the operation of the viewer the film does come loose from its support due to a loss of vacuum, the light is cut off before the film is excessively heated.

Figure 7:
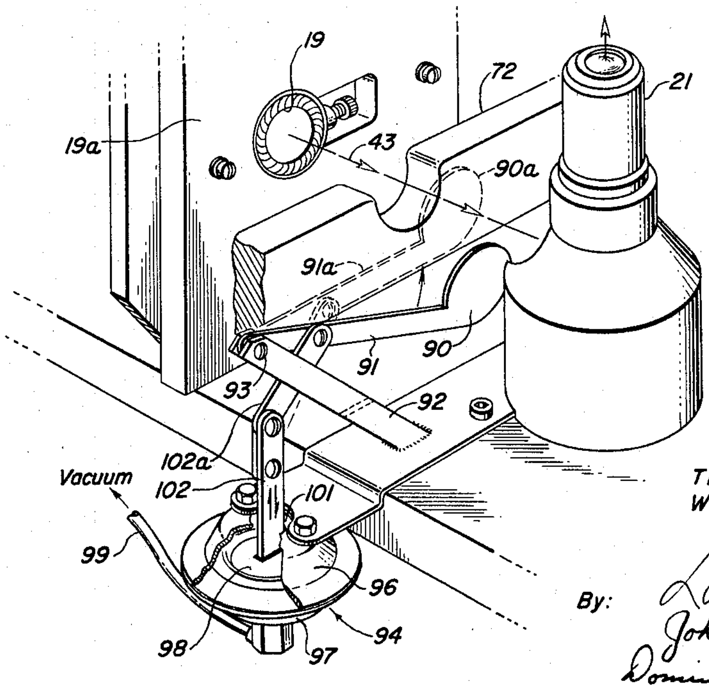
FIG. 7 is an enlarged pictorial view of the transducer means which cuts-off the projection light beam to prevent excessive heating of the film.

Referring to FIG. 7, the preferred embodiment of the means is shown and includes a flat shutter 90 fixed at the end of an arm 91. The arm 91 is pin-connected at the other end to a strut 92 by a pin 93. The arm 91 is pivoted about pin 93 by the pressure transducer 94, that is referred to above, and is suitably mounted within the viewer. The transducer 94 is a standard diaphragm type and made of two bowl-shaped housings, an upper housing 96 and a lower housing 97. The housings 96 and 97 are sealed together by their outwardly extending flanges with a flexible diaphragm 98 stretched between the two housings. Thus, a chamber is formed on each side of the diaphragm 98. The chamber formed by the lower housing 97 and the diaphragm 98 communicates through the tubing 99 to the other branch of the T-fitting 53. Thus, the pressure in the chamber is the same as in the groove 46. The upper housing 96, being suitably bolted to the viewer, has a central opening 101 that keeps the chamber therein at atmospheric pressure. Through opening 101 protrudes a connecting rod 102 fixed at one end to the center of the diaphragm 98. In order to conserve space, connecting rod 102 has fixed thereto a bent member 102*a* which is, in turn, pin-connected to arm 91. Now, when the vacuum in the groove 46 is high, the diaphragm 98 is pushed into the lower housing 97 due to atmospheric pressure. This causes the arm 91 to rotate to the position as shown in FIG. 7. When the vacuum in the groove 46 is lost, the diaphragm has sufficient spring action to rotate arm 91 upward placing shutter 90 the way of the light beam. Dashed line 43 represents the center of the light beam and dashed lines 90*a* and 91*a* represent the position of the shutter 90 and the arm 91 when the shutter cuts-off the light beam.

Although the viewer magnifies a micro-image about 200 times, the picture on the screen 15 is made to appear smooth and relaxing to the eye by providing a feature that prevents the light on the screen from scintillating. Scintillation is prevented because the screen is made of two pieces of ground glass plate 15*a* and 15*b* (FIG. 3) The outer ground glass plate 15*a* is held stationary and fixed to the upper enclosure 11 while the inner ground glass 15*b* is disposed to move with respect to the outer glass plate 15*a*. Motion is applied to the inner glass plate 15*b* by an electric motor 103 through a suitable mechanical linkage 104. The motor 103 is conveniently mounted on the side of the screen 15, for example, the right side (as shown in FIG. 6) and out of the way of the light beam. The linkage 104 includes, for example, an eccentric cam 104*a* fixed on the rotating shaft of the motor 103. The eccentric cam 104*a* is suitably journaled within a circular bore 104*b* formed in plate 15*b* whereby the right side of the plate 15*b* is supported by the eccentric cam 104*a*. The other side (left side) of the plate 15*b* is supported by a pin 104*c* engaging an elongated slot 104*d* formed in the plate 15*b*. The pin 140*c* is fixed relative to the viewer by suitable means, not shown. The portion of the plate 15*b*, on which the picture is projected, moves relative to plate 15*a* with a continuous, nonreciprocating, oval motion. Therefore, momentary or localized scintillation effects on the screen are eliminated. The motor 103 is energized when the "On-Off" button 31 is initially pushed to energize the system and is turned off when button 31 is pushed to secure the system.

It should now be evident that the embodiment of the viewer, as described herein, is a compact economical unit that combines standard optical components to produce a new and useful result. The viewer is capable of projecting onto a screen a picture of a high resolution micro-image that is provided on a relatively thin flexible transparent film. The enlarge picture, formed on the screen, is able to be read in a well-lighted room without undue eye strain. To accomplish this result, for economy and availability of optical elements, the viewer uses a compound microscope that has a focal plane spaced about 1.5 millimeters from the nearest microscope lens elements. Since this space is small, the invention provides a means for cooling the film in the form of a vacuum. The vacuum holds the film flat and against a clear glass plate that transmits light very efficiently to illuminate the film. The means for cooling the film does not interfere with the position of the projection lens. The means, also, allows the system to have the maximum possible resolution with a minimum of cost because a relatively small size projection lens having a relatively high numerical aperture and a small working distance can be used in the system. The viewer also includes a feature which maintains each micro-image, in turn, substantially within the small depth of focus of the projection lens when the film is being searched so that each picture, projected on the screen, can be at least distinguished from each other.

Various other modifications and variations of the present invention are contemplated and will become apparent to those skilled in the art without departing from the spirit and scope of the invention. Therefore, the invention is not limited to the exemplary apparatus or procedures described, but includes all embodiments within the scope of the claims.

What is claimed is:

1. A micro-image viewer for reading a flat flexible film having a micro-image provided thereon, said viewer comprising: a transparent rigid plate having a flat surface against which said film is disposed; a transport means for supporting and moving said plate so that said flat surface moves within a plane; a light source including a light condensing and heat filtering system arranged on one side of said plate and opposite said flat surface for directing a concentrated high intensity light spot at said flat surface; a projection lens system including a projection lens and a screen arranged on the side of said plate opposite from said light condensing system to receive light passing through said plate and said film and to focus an enlarged picture on said screen of said micro-image; said projection lens having a construction such that the distance between said projection lens and said film when said picture is in focus on said screen is less than two millimeters; and vacuum means for sucking air from between said film and said plate to allow atmospheric pressure to hold said film in continuous contact with said plate to allow said plate to conduct heat away from said film.

2. A micro-image viewer for reading a flat flexible film having micro-images provided thereon, said viewer comprising: a transparent rigid plate having a flat surface against which said film is disposed; a transport means for supporting said plate and for moving said plate in two orthogonal directions so that said flat surface moves within a plane; a light source including a light condensing and heat filtering system arranged on one side of said plate and opposite said flat surface for forming a concentrated high intensity light spot at said flat surface; a screen; a projection lens system including a projection lens arranged on the side of said plate opposite from said light condensing system to receive the light passing through said plate and said film and to focus an enlarged picture of said micro-images on said screen; said projection lens having a focal length such that the distance between said projection lens and said film, when said picture is in focus on said screen, is less than two millimeters; said plate having a groove formed along the border of said flat surface and said film being disposed relative to said plate with said groove enclosing said micro-images on the film, and with said film covering said groove; means for sucking air from said groove to cause atmospheric pressure to hold said film against said plate and to allow said plate to conduct heat away from said film; and transducer means responsive to the pressure within said groove to cut-off said high intensity light spot when the pressure within said groove approaches atmospheric pressure.

3. A micro-image viewer for reading a flat, flexible film having a micro-image provided thereon, said viewer comprising: a transparent rigid plate having a flat surface against which said film is disposed; a light source including a light condensing system arranged on one side of said plate; a projection lens system arranged on the opposite side of said plate from said condensing system and on the same side as said flat surface to receive the light from said source transmitted through said film; said projection lens system comprising a screen and a projection lens for projecting a picture of said micro-image on said screen; and vacuum means for sucking air from between said plate and said film to cause atomspheric pressure to hold said film flat against said plate in order to allow said plate to conduct heat away from said film.

4. A micro-image viewer for reading a flat, flexible film having a plurality of micro-images provided thereon, said viewer comprising: a transparent rigid plate having a flat surface against which said film is disposed; a light source including a light condensing system arranged on one side of said plate to direct a light beam toward said plate; a projection lens system arranged on the opposite side of said plate from said light condensing system and on the same side as said flat surface to receive the light from said source transmitted through said film; said projection lens system comprising a screen and a projection lens having a working distance of less than two millimeters and a depth of focus of less than two microns; a transport means for supporting and for moving said plate in two directions so that said flat surface moves within a plane; said transport means including: a frame for supporting said plate in fixed relation thereto; a pair of parallely disposed rods on which said frame is mounted to move; said frame making journal contact with one of said rods at two places and with the other of said rods at one place so that said frame is stable at whatever position it is relative to said rods; and adjustment means disposed at the ends of said rods for adjusting each of said rods independently from the other rod to make said flat surface normal to said projection lens so as to move said flat surface within said plane as said frame moves along said rods.

5. A micro-image viewer for reading a flat, flexible film having a plurality of micro-images provided thereon, said viewer comprising: a transparent rigid plate having a flat surface against which said film is disposed; a light source including a light condensing system arranged on one side of said plate to direct a light beam toward said plate; a projection lens system arranged on the opposite side of said plate from said condensing system and on the same side as said flat surface to receive the light from said source transmitted through said film; said projection lens system comprising a screen and a projection lens having a working distance of less than two millimeters and a depth of focus of less than two microns; a transport means for supporting and for moving said plate in two directions so that said flat surface moves within a plane; said transport means including: a frame on which said plate is mounted; a first pair of rods disposed parallel to each other and on which said frame is slidably mounted to move in the direction of said first pair of rods; said frame making journal contact with one rod of said first pair at two places and with the other rod of said first pair at one place so that said frame is stable at whatever position it is relative to said first pair of rods; a support to which said first pair of rods are monuted; a second pair of rods disposed parallel to each other and on which said support is slidably mounted to move in the direction of said second pair of rods; said support making journal contact with one rod of said second pair at two places and with the other rod of said second pair at one place so that said support is stable at whatever position it is relative to said second pair of rods; and adjustment means disposed at the ends of said first pair of rods for mounting said first pair of rods on said support and disposed at the ends of said second pair of rods for fixedly mounting said second pair of rods relative to said viewer, said adjustment means being disposed to adjust each of said rods independently from the other rods to make said flat surface substantially normal to said projection lens so as to move said plate within said plane with respect to said projection lens.

6. A micro-image viewer fo rreading a flat, flexible film having a plurality of micro-images provided thereon, said viewer comprising: a transparent rigid plate having a flat surface against which said film is disposed; a transport means for supporting and moving said plate in two directions so that said flat surface moves within a plane; a light source including a light condensing system arranged on one side of said plate to direct a light beam towards said plate; a projection lens system including a projection lens and a screen arranged on the side of said plate opposite from said light source and on the same side as said flat surface to receive light passing through said plate and said film and to focus an enlarged picture on said screen of said micro-images; said plate having a continuous groove formed near the edges of said flat surface and said film being disposed relative to said plate with said groove enclosing said micro-images on the film and with a portion of said film covering said groove; an air vacuum pump communicating with said groove for sucking air from said groove to cause atmospheric pressure to hold said film against said plate in order to allow said plate to conduct heat away from said film; transducer means comprising a compartment having one wall thereof made of a flexible diaphragm that flexes as the pressure in said compartment varies; said compartment communicating with said groove so that the pressures in said groove and compartment are substantially equal; a movable shutter disposed to move into and out of the light beam of said light condensing system to control the light that illuminates said film; and connecting means connected between said shutter and said diaphragm to cause said shutter to move as said diaphragm flexes.

7. A micro-image viewer for reading a flat, flexible film having a micro-image provided thereon, said viewer comprising: a transparent rigid plate having a flat surface against which said film is disposed; a light source including a light condensing system arranged on one side of said plate; a projection lens system arranged on the opposite side of said plate from said condensing system and on the same side as said flat surface to receive the light from said source transmitted through said film; said projection lens system comprising a screen and a projection lens for projecting a picture of said micro-image on said screen; vacuum means for sucking air from between said plate and said film to cause atmospheric pressure to hold said film flat and smooth against said plate in order to allow said plate to conduct heat away from said film; said screen comprising a first glass plate fixedly mounted relative to said viewer and a second glass plate movably mounted relative to said first plate and parallel thereto; a motor having a rotating shaft with an eccentric cam fixed thereto; and means for connecting said second plate to said eccentric cam for applying an oval motion to the viewing portion of said second plate relative to the viewing portion of said first plate when said shaft is rotating.

8. A micro-image viewer for reading a flat, flexible film having a micro-image with a maximum resolution of over 500 lines per millimeter provided thereon, said viewer comprising: a transparent rigid plate having a flat surface against which said film is disposed; a light source including a light condensing system arranged on one side of said plate; a projection lens system arranged on the opposite side of said plate from said condensing system and on the same side as said flat surface to receive the light from said source transmitted through said film; said projection lens system comprising a screen and a projection lens for projecting a picture of said micro-image on said screen; said projection lens having a working distance of less than two millimeters when said picture is in focus on said screen; means for holding said film flat against said rigid plate and which means does not interfere with the position of said lens when said picture is in focus on said screen.

9. A micro-image viewer for reading a flat, flexible film having a micro-image provided thereon, said viewer comprising: a transparent rigid plate having a flat surface against which said film is disposed; a light source including a light condensing system arranged on one side of said plate; a projection lens system arranged on the opposite side of said plate from said condensing system and on the same side as said flat surface to receive the light from said source transmitted through said film; said projection lens system comprising a screen and a projection lens for projecting a picture of said micro-image on said screen; vacuum means for sucking air from between said plate and said film to cause atmospheric pressure to hold said film flat and smooth against said plate in order to allow said plate to conduct heat away from said film; said screen comprising a first glass plate fixedly mounted relative to said viewer and a second glass plate movably mounted relative to said first plate and parallel thereto; a motor having a rotating shaft with an eccentric cam fixed thereto; means for connecting said second plate to said eccentric cam for applying an oval motion to the viewing portion of said second plate relative to the viewing portion of said first plate when said shaft is rotating, a transport means for supporting and for moving said transparent plate in two directions so that said flat surface moves within a plane; said transport means including: a frame on which said transparent plate is mounted; a first pair of rods disposed parallel to each other and on which said frame is slidably mounted to move in the direction of said first pair of rods; said frame making journal contact with one rod of said first pair at two places and with the other rod of said first pair at one place so that said frame is stable at whatever position it is relative to said first pair of rods; a support to which said first pair of rods are mounted; a second pair of rods disposed parallel to each other and on which said support is slidably mounted to move in the direction of said second pair of rods; said support making journal contact with one rod of said second pair at two places and with the other rod of said second pair at one place so that said support is stable at whatever position it is relative to said second pair of rods; and adjustment means disposed at the ends of said first pair of rods for mounting said first pair of rods on said support and disposed at the ends of said second pair of rods for fixedly mounting said second pair of rods relative to said viewer, said adjustment means being disposed to adjust said flat surface to be substantially normal to said projection lens so as to move said plate within said plane with respect to said projection lens.

10. A micro-image viewer for reading a flat flexible film having micro-images provided thereon, said viewer comprising: a transparent rigid plate having a flat surface against which said film is disposed; a transport means for supporting said plate and for moving said plate in two orthogonal directions so that said flat surface moves within a plane; a light source including a light condensing and heat filtering system arranged on one side of said plate and opposite said flat surface for forming a concentrated high intensity light spot at said flat surface; a screen; a projection lens system including a projection lens arranged on the side of said plate opposite from said light condensing system to receive the light passing through said plate and said film to focus an enlarged picture of said micro-images on said screen; said projection lens having a focal length such that the distance between said projection lens and said film, when sad picture is in focus on said screen, is less than two millimeters; said plate having a groove formed along the border of said flat surface and said film being disposed relative to said plate with said groove enclosing said micro-images on the film, and with said film covering said groove; means for sucking air from said groove to cause atmospheric pressure to hold said film against said plate and to allow said plate to conduct heat away from said film; transducer means responsive to the pressure within said groove to cut-off said high intensity light spot when the pressure within said groove approaches atmospheric pressure; said screen comprising a first glass plate fixedly mounted relative to said viewer and a second glass plate movably mounted relative to said first plate and parallel thereto; a motor having a rotating shaft with an eccentric cam fixed thereto; means for connecting said second plate to said eccentric cam for applying an oval motion to the viewing portion of said second plate relative to the viewing portion of said first plate when said shaft is rotating; said transport means including: a frame on which said transparent plate is mounted; a first pair of rods disposed parallel to each other and on which said frame is slidably mounted to move in the direction of said first pair of rods; said frame making journal contact with one rod of said first pair at two places and with the other rod of said first pair at one place so that said frame is stable at whatever position it is relative to said first pair of rods; a support to which said first pair of rods are mounted; a second pair of rods disposed parallel to each other and on which said support is slidably mounted to move in the direction of said second pair of rods; said support making journal contact with one rod of said second pair at two places and with the other rod of said second pair at one place so that said support is stable at whatever position it is relative to said second pair of rods; and adjustment means disposed at the ends of said first pair of rods for mounting said first pair of rods on said support and disposed at the ends of said second pair of rods for fixedly mounting said second pair of rods relative to said viewer, said adjustment means being disposed to adjust said flat surface to be substantially normal to said projection lens so as to move said transparent plate within said plane with respect to said projection lens

11. A micro-image viewer for reading a flat flexible film having micro-images with a maximum resolution of over 500 lines per millimeter provided thereon, said viewer comprising: a transparent rigid plate having a flat surface against which said film is disposed; a transport means for supporting said plate and for moving said plate in two orthogonal directions so that said flat surface moves within a plane; a light source including a light condensing and heat filtering system arranged on one side of said plate and opposite said flat surface for forming a concentrated high intensity light spot at said flat surface; a screen; a projection lens system including a projection lens arranged on the side of said plate opposite from said light condensing system to receive the light passing through said plate and said film to focus an enlarged picture of said micro-image on said screen; said projection lens having a focal length such that the distance between said projection lens and said film, when said picture is in focus on said screen: is less than two millimeters; said plate having a groove formed along the border of said flat surface and said film being disposed relative to said plate with said groove enclosing said micro-images on the film, and with said film covering said groove; means for sucking air from said groove to cause atmospheric pressure to hold said film against said plate and to allow said plate to conduct heat away from said film; transducer means responsive to the pressure within said groove to cut-off said high intensity light spot when the pressure within said groove approaches atmospheric pressure; said screen comprising a first glass plate fixedly mounted relative to said viewer and a second glass plate movably mounted relative to said first plate and parallel thereto; a motor having a rotating shaft with an eccentric cam fixed thereto; means for connecting said second plate to said eccentric cam for applying an oval motion to the viewing portion of said second plate relative to the viewing portion of said first plate when said shaft is rotating; said transport means including: a frame on which said transparent plate is mounted; a first pair of rods disposed parallel to each other and on which said frame is slidably mounted to move in the direction of said first pair of rods; said frame making journal contact with one rod of said first pair at two places and with the other rod of said first pair at one place so that said frame is stable at whatever position it is relative to said first pair of rods; a support to which said first pair of rods are mounted; a second pair of rods disposed parallel to each other and on which said support is slidably mounted to move in the direction of said second pair of rods; said support making journal contact with one rod of said second pair at two places and with the other rod of said second pair at one place so that said support is stable at whatever position it is relative to said second pair of rods; adjustment means disposed at the ends of said first pair of rods for mounting said first pair of rods on said support and disposed at the ends of said second pair of rods for fixedly mounting said second pair of rods relative to said viewer; said adjustment means being disposed to adjust said flat surface to be substantially normal to said projection lens so as to move said transparent plate within said plane with respect to said projection lens; said transducer means comprising a compartment having one wall thereof made of a flexible diaphragm that flexes as the pressure in said compartment varies; said compartment communicating with said groove so that the pressures in said groove and compartment are substantially equal; a movable shutter disposed to move into and out of the light beam of said light condensing system to control the light that illuminates said film; and connecting means connected between said shutter and said diaphragm to cause said shutter to move as said diaphragm flexes.

References Cited by the Examiner

UNITED STATES PATENTS

| | | | |
|---|---|---|---|
| 2,588,373 | 3/1952 | Erban | 88—57 |
| 2,701,979 | 2/1955 | Pratt et al. | 88—24 |
| 3,081,682 | 3/1963 | Khoury | 95—45 |
| 3,131,594 | 5/1964 | Benson | 88—24 |

NORTON ANSHER, *Primary Examiner.*

HAROLD H. FLANDERS, *Assistant Examiner.*